United States Patent Office.

WILLIAM HUTSON FORD AND SAMUEL LOGAN, OF NEW ORLEANS, LOUISIANA, ASSIGNORS TO WHEELOCK, FINLAY, AND COMPANY, OF SAME PLACE.

*Letters Patent No. 85,297, dated December 29, 1868.*

IMPROVED DISINFECTANT OR OZONE-GENERATOR.

The Schedule referred to in these Letters Patent and making part of the same.

*To all whom it may concern:*

Be it known that we, WILLIAM HUTSON FORD and SAMUEL LOGAN, of the city of New Orleans, parish of Orleans, and State of Louisiana, have invented a certain new and useful Disinfectant and Ozone-Generator, to be employed for destroying animal and vegetable exhalations, arresting putrefaction, and for bleaching, and various other purposes; and we do hereby declare the following to be a full, clear, and exact description of our method of compounding and using the same.

But before we proceed to do this, it is proper to remark that the action of ozone upon the gaseous emanations of putrefying animal and vegetable substances is familiar knowledge to chemists. All the effluvia from those substances which have been the subjects of study, such as sulphuretted hydrogen, sulphydrate of ammonia, phosphorated hydrogen, carburetted hydrogen, carbonic oxide, ammonia, &c., are all qualified by a high degree of affinity for oxygen. Ozone being simply oxygen in its most active form, immediately combines with, neutralizes, and destroys all the above and similar substances. It is an equally well established fact that ozone is far more efficient than chlorine or any other known chemical agent, in the neutralization and destruction of all offensive odors or stenches that result from gaseous contaminations of the atmosphere, and unlike chlorine, it is now admitted to be a constituent of the blood as a constant physiological component of the human body. Its variations in quantity in the animal body being closely dependent on the amount that is present in the atmosphere, its redundancy or deficiency is usually more or less connected with the appearance of various epidemic diseases.

It is from the recognition and appreciation of these facts that many efforts have been made to devise a method of generating ozone with ease and certainty; but hitherto these efforts have been abortive, or only partially successful. The best of these methods, the "Ruhmkorff coil," and an admixture of sulphuric acid with permanganate of potassa, whilst admissible in the laboratory, are obviously not available for popular use.

To attain the same end, therefore, namely, a ready and abundant evolution of ozone for the purposes above indicated, as well as for bleaching textile fabrics, colored liquids, saccharine juices, and sirups, &c., we have devised a combination of chemical substances, whose reaction upon each other and upon the atmosphere generates ozone immediately and in great abundance.

Our compound is a perfectly dry powder, which, when simply sprinkled on any surface that is exposed to the atmosphere, absorbs moisture therefrom, and then undergoes immediate decomposition, and evolves ozone in the most abundant measure.

It is composed of dry permanganate of potassa or soda in fine powder; of dry finely-powdered bisulphate of potassa, or common commercial alum, in any of its varieties; of sulphate of alumina, or of any other acid, bisulphate, or persulphate, and of a deliquescent substance of any kind whatsoever.

In the practical application of the principle of combining these ingredients to create our compound, we carefully commingle from one to two parts of commercial permanganate of potassa with from fifteen to twenty parts of finely-powdered commercial alum, and from six to eight parts, all by weight, of chloride of calcium or chloride of zinc. These chlorides, being extremely deliquescent, must be ground into a fine powder in a dried chamber, or else some other equally efficient means must be taken to prevent an absorption of water from the air, alike during the process of trituration and of their admixture with the other materials.

When duly and intimately combined, in the above or approximate proportions, the compound may be kept unchanged for any length of time in glass or earthen vessels.

When applied to use, it is simply necessary to sprinkle the compound about, or to place it in shallow vessels, for, when this is done, the following reactions immediately take place:

The chlorides above mentioned, or other deliquescent substances employed in lieu thereof, instantly begin to absorb water from the air, and the mass becomes gradually moistened, and this is the whole function performed by the deliquescent ingredient, so far as the generation of ozone is concerned.

We have seen that as long as the powder remains dry no reaction occurs between the alum, or bisulphate of potassa or of soda, or other substituted acid-sulphate that may be used instead thereof, and the permanganate. While dry, therefore, the powder does not exhale ozone; but as soon as it becomes moist, in the above-described manner, or even by the direct aspersion of water, the acid-sulphate reacts upon the permanganate with a mutually-decomposing effect, and oxygen, in its ozonized form, is freely liberated and diffused in the surrounding air, as may be demonstrated by any of the usual tests, but especially by the well-known ozonoscopic iodide of potassium starch-paper.

Our compound, therefore, as above described, is automatic in its reactions, since it is only requisite to expose it to the air to produce the desired effect, without the addition of any other substance whatsoever; and when prepared in the proportions substantially as above given, the generation of ozone continues until all the permanganate is decomposed, and hence a continual evolution of ozone is kept up for several days.

The use of the acid-sulphates has been adopted by us as a feasible and popular mode of supplying sulphuric acid in a form which secures the integrity of the powder until it is to be used, and in this respect our powder differs from all other known ozonifying-compounds.

The combination of alum with the permanganate, without the addition and admixture of a deliquescent substance, is exceedingly valuable as an antiseptic, for arresting putrefaction in liquids and solids, and it may be used beneficially for a great variety of purposes.

The combination of the alkaline permanganates, the acid-sulphates, and the chloride of zinc, is an antiseptic mixture, that may be used as a general antiseptic; but it is particularly applicable to and valuable in anatomical operations, and as a disinfectant of sinks, sewers, foul liquids, and the like.

Having thus described our invention,

What we claim, and desire to secure by Letters Patent, is—

The compound herein described, that is to say, the combination of acid-sulphates, in the form of dry powder, with alkaline permanganate, substantially in the proportions herein given, with or without the admixture of a chloride or other deliquescent substance, as a joint disinfectant and ozone-generator.

WM. HUTSON FORD.
SAMUEL LOGAN.

Witnesses:
EDWARD MILNOR,
RUFUS R. RHODES.